US006801425B2

(12) United States Patent
Buck et al.

(10) Patent No.: US 6,801,425 B2
(45) Date of Patent: Oct. 5, 2004

(54) ERGONOMIC CONTROL PANEL FOR A PORTABLE ELECTRIC GENERATOR

(75) Inventors: John E. Buck, Cockeysville, MD (US); Peter E. Morris, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 48 days.

(21) Appl. No.: 09/873,468

(22) Filed: Jun. 4, 2001

(65) Prior Publication Data

US 2002/0180407 A1 Dec. 5, 2002

(51) Int. Cl.[7] .............................. H02B 1/52; H02B 1/26

(52) U.S. Cl. ....................... 361/625; 361/628; 361/634; 307/153; 322/14

(58) Field of Search ................................ 361/601, 623, 361/625, 627, 628, 634, 679, 724; 307/68, 78, 149, 153; 290/7, 31, 32, 47, 48; 322/14, 44; 359/142, 148

(56) References Cited

U.S. PATENT DOCUMENTS

| | | | | | |
|---|---|---|---|---|---|
| 2,361,768 | A | | 10/1944 | Heintz | |
| 2,898,542 | A | * | 8/1959 | Wasko et al. | 322/90 |
| 2,937,832 | A | | 5/1960 | Treiber | |
| 3,194,525 | A | | 7/1965 | Webb | |
| 4,173,951 | A | | 11/1979 | Ishihara | |
| 4,526,228 | A | * | 7/1985 | Wynn | 166/53 |
| 4,721,070 | A | * | 1/1988 | Tanaka et al. | 123/2 |
| 4,729,353 | A | | 3/1988 | Streng | |
| 4,798,082 | A | * | 1/1989 | Fujikawa et al. | 73/117.3 |
| 4,907,546 | A | | 3/1990 | Ishii et al. | |
| 5,353,762 | A | * | 10/1994 | Dykstra et al. | 123/352 |
| 5,574,622 | A | * | 11/1996 | Brown | 361/625 |
| 5,697,249 | A | | 12/1997 | Miguchi | |
| 5,734,148 | A | * | 3/1998 | Latvis et al. | 219/133 |
| 5,765,995 | A | * | 6/1998 | Springer | 417/40 |
| 5,924,393 | A | | 7/1999 | Kikuchi | |
| 5,965,949 | A | | 10/1999 | Fukuda et al. | |
| 6,034,511 | A | * | 3/2000 | Scott et al. | 322/46 |
| 6,067,945 | A | * | 5/2000 | Fukuda et al. | 123/2 |
| 6,181,019 | B1 | | 1/2001 | Frank | |
| 6,313,543 | B1 | * | 11/2001 | Frank | 290/1 A |
| 6,331,740 | B1 | | 12/2001 | Morohoshi et al. | |
| 2002/0125115 | A1 | * | 9/2002 | Burkholder et al. | 200/51.11 |

FOREIGN PATENT DOCUMENTS

| | | | | |
|---|---|---|---|---|
| DE | 35 28 148 | | 2/1987 | |
| DE | 44 14 067 | | 10/1995 | |
| JP | 09151745 A | * | 6/1997 | F02B/63/04 |
| JP | 2000042300 A | * | 2/2000 | D06F/95/00 |

OTHER PUBLICATIONS

European Search Report dated Aug. 12, 2003 for P–EP–TN2579, 3 pages.

* cited by examiner

*Primary Examiner*—Anatoly Vortman
(74) *Attorney, Agent, or Firm*—Harness, Dickey & Pierce, P.L.C.

(57) ABSTRACT

A control panel for a portable electric generator. The control panel includes three distinct zones having logically organized switches and outlets. The first zone includes those switches used most frequently. The second zone includes a plurality of 120VAC electrical outlets and at least one 120/240VAC outlet. The 120VAC outlets are separated from the 120/240VAC outlet by a horizontally arranged, rocker style voltage selector switch for selecting either 120/240 VAC or 120VAC operation. A third zone includes an auto throttle control for controlling an engine of the generator. The placement and organization of the switches and electrical outlets within clearly defined zones reduces the possibility of the operator unintentionally selecting the wrong outlet for use or unintentionally selecting the wrong switch.

34 Claims, 2 Drawing Sheets

ERGONOMIC CONTROL PANEL FOR A PORTABLE ELECTRIC GENERATOR

FIELD OF THE INVENTION

The present invention relates to control panels for devices such as portable electric generators, and more particularly to an ergonomic control panel for a portable electric generator.

BACKGROUND OF THE INVENTION

Portable electric generators are used in a wide variety of applications. Such applications include use at construction sites for powering various electric power tools such as drills, saws, lights, electric heaters, etc., as well as in residential applications for providing a back-up source of electric power in the event of a power outage. Such portable electric generators typically have a control panel with a plurality of electrical outlets and switches for selecting certain outlets thereof for use. For example, generators which provide either 120VAC or 240VAC use a switch by which the user selects either 120VAC or 240VAC operation. Circuit breakers are also often included at various locations on the control panel.

Typically the above-described outlets, breakers and switches are not logically organized on the generator control panel. This can lead to considerable confusion on the part of the user in the event the user is in a hurry to plug a power cord into one of the outlets of the generator or if lighting conditions are not acceptable, leading to difficulty in the operator seeing the switches, outlets or breakers that the user needs to access.

Accordingly, it would be highly beneficial to provide a control panel for a portable electric generator that logically groups the various switches, outlets and circuit breakers used to control operation of the generator into different areas or “zones”. More specifically, it would be highly advantageous to provide a plurality of distinct zones on the control panel wherein the various outlets, breakers and switches of the generator are grouped within each zone in a fashion that significantly eases the use of the generator and reduces the possibility of operator error in selecting outlets, switches or breakers.

SUMMARY OF THE INVENTION

The present invention relates to a control panel for a portable electric generator. The control panel is segmented into a plurality of distinct regions or “zones”. Each zone includes logically related and organized components to minimize the possibility of the operator accidentally selecting the wrong control or mistakingly trying to engage the plug of a power extension cord with an improper (i.e., non-mating) electrical outlet of the generator.

In a preferred embodiment, an ON/OFF engine switch is included in the first zone. A plurality of electrical receptacles are included within a second zone disposed adjacent to the first zone. A third zone includes a control for controlling the internal combustion engine of the generator.

In one preferred embodiment the first zone also comprises a circuit breaker switch. The circuit breaker switch and the ON/OFF engine switch are further disposed at longitudinally opposite ends of the first zone to reduce the possibility of the operator mistakingly engaging one of these switches when the operator intended to engage the other one of the switches.

The second zone includes at least one, and more preferably a plurality, of electrical outlets for supplying a first voltage, and at least one outlet for supplying a second voltage. In one preferred form the first outlets provide 120VAC and the second outlet provides 240VAC. The 240VAC outlet is further disposed at a longitudinally opposite end of the second zone from the first outlets to minimize the possibility of the operator mistakingly trying to plug in a power cord plug into the wrong outlet. The 240VAC outlet is further separated from the 120VAC outlets by a voltage selector switch for selecting either 120VAC or 240VAC operation. A plurality of thermal circuit breakers are further disposed closely adjacent each of the outlets to provide a clear indication when the current being drawn by a given outlet has exceeded a maximum predetermined level, thus “tripping” the breaker.

In the preferred embodiments, each of the zones are further laid out as horizontally disposed, rectangular zones positioned adjacent one another. Optionally, one or more longitudinal frame members of a frame of the generator may be used to demarcate the zones from one another. The frame members also provide protection from accidental damage to electrical components on the control panel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION OF THE PREFERRED EMBODIMENTS

Figure 1:
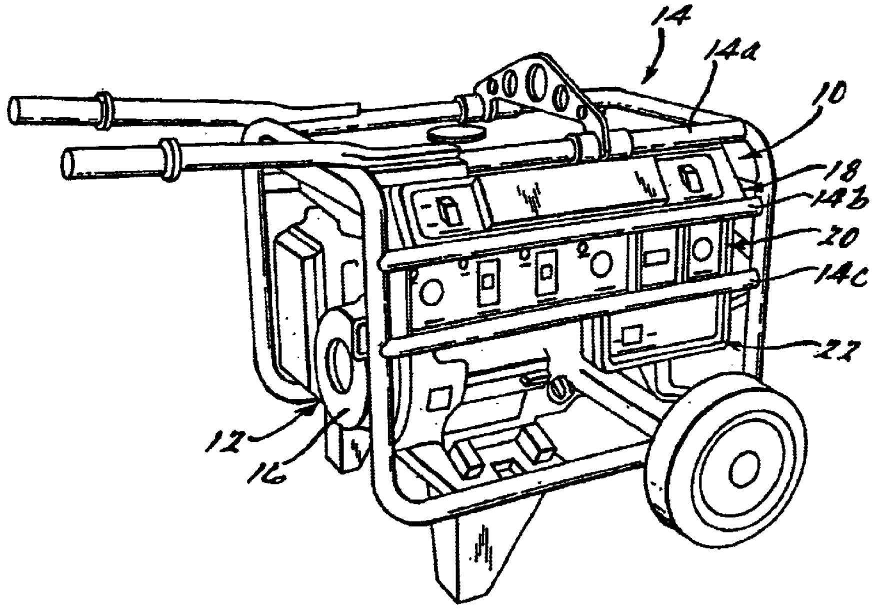
FIG. 1 is a perspective view of a generator incorporating a control panel in accordance with a preferred embodiment of the present invention.

Referring to FIG. 1, there is shown a control panel 10 used with a portable electric generator 12. The generator 12 includes a frame 14 for supporting an internal combustion engine 16. An electric generator (hidden from view) is coupled to an output shaft of the engine 16.

Figure 3:
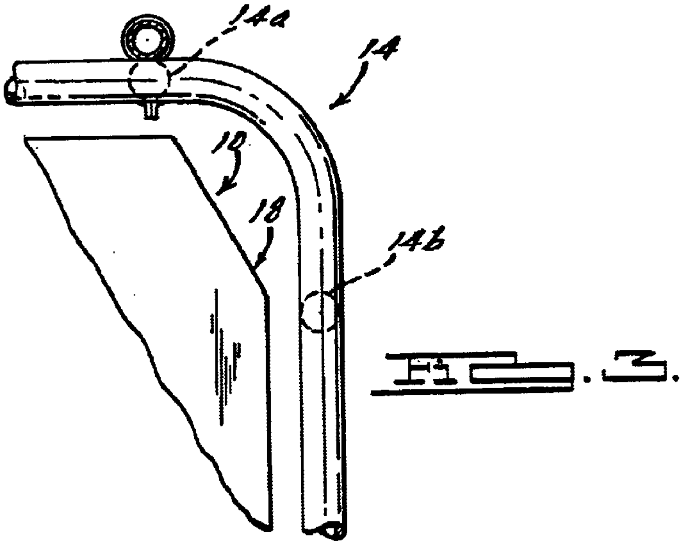
FIG. 3 is an end view of a portion of the generator.
Figure 2:
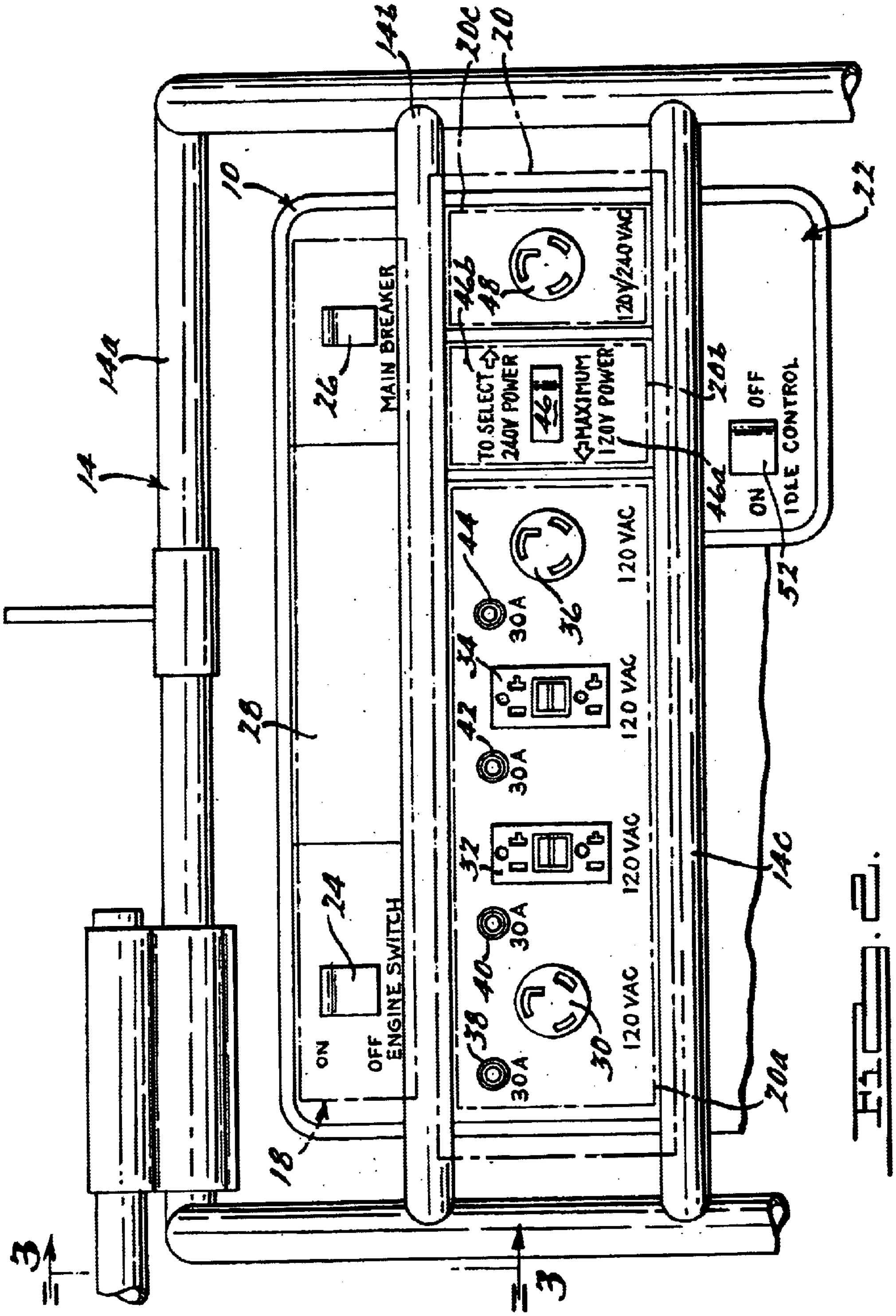
FIG. 2 is an enlarged view of just the control panel and a portion of the generator frame.

Referring to FIG. 2, the control panel 10 is shown in greater detail. The control panel 10 includes a plurality of switches and electrical receptacles which are logically and ergonomically arranged to provide significantly increased ease of use of the generator 12. To this end, the control panel 10 is divided into a plurality of distinct regions or “zones” 18, 20 and 22. The frame 14 further includes tubular frame members 14*a*, 14*b* and 14*c* which are disposed generally parallel to one another, and which further help to demarcate the three distinct zones 18, 20 and 22 of the control panel 10 and to protect the components on the control panel from damage due to accidental contact with other tools or objects. Each zone 18, 20 and 22 comprises a horizontally laid out, generally rectangular area, and each of the zones are arranged parallel to one another. The uppermost zone 18 includes an ON/OFF engine switch 24 at one longitudinal end of the zone 18 and a main circuit breaker switch 26 at the opposite longitudinal end of the zone. The switches 24 and 26 are further separated by an indicia member or area 28 in which a company name or other indicia identifying the manufacturer of the generator 12 may be included. The first zone 18 of the control panel 10 is further formed so as to be inclined slightly relative to the other zones 20 and 22, as indicated in FIG. 3, to present slightly easier access to the switches 24 and 26. Each of the switches 24 and 26 are illustrated as rocker style switches, but it will be appreciated that push button switches, slide style switches, toggle style switches or virtually any other form of switch could easily be incorporated in lieu of rocker style switches.

The second zone 20 is also configured as an elongated, rectangular region. The second zone 20 includes a plurality of electrical receptacles or outlets 30, 32, 34 and 36 arranged within a first subregion 20*a*. Outlets 30 and 36 comprise conventional twist lock receptacles for use with mating male twist lock electrical plugs. Outlets 30 and 36 preferably are capable of supplying 20 to 30 amps of current. Electrical outlets 32 and 34 are ground fault interrupter (GFI) electrical outlets which each supply 120VAC and preferably up to 20 amps of current or more.

Thermal circuit breakers 38, 40, 42 and 44 are each associated with a respective one of the outlets 30-36. Advantageously, each thermal breaker 38–44 is disposed closely adjacent the electrical receptacle 30–36 with which it is associated. Thus, thermal breaker 38 is associated with outlet 30, thermal breaker 40 is associated with outlet 32, thermal breaker 42 is associated with outlet 34 and thermal breaker 44 is associated with outlet 36.

With further reference to FIG. 2, a voltage selector switch 46 is disposed within a second subregion 20*b* of region 20 while a 120/240VAC electrical outlet 48 is disposed within a third subzone 20*c* of zone 20. The voltage selector switch 46 in one preferred from comprises a rocker style switch which is laid out horizontally. Indicia 46*a* to the left of switch 46 indicates to the user that depressing the left side of the switch selects the outlets 30–36 for maximum 120VAC power. Pressing the right side of switch 46 selects outlet 48 for 240VAC operation. The placement of the switch 46 inbetween the group of outlets 30–36 and outlet 48, along with its horizontal positioning, helps to ensure that the operator realizes which electrical receptacles are being selected for use. By requiring the operator to push the left side of the switch 46 if one or more of the electrical outlets 30–36 are to be used, or to depress the right side of the switch 46 if outlet 48 is to be used, there is a further degree of logical control introduced into the selection of which outlets 30–36 and 48 the operator is selecting for use.

Another advantage to the above-described layout is that the 120/240VAC electrical outlet 48 is disposed at the longitudinally opposite end of the zone 20*b* from the 120VAC electrical outlets 30-36. This further helps to reduce the possibility that the operator may inadvertently attempt to plug a 120VAC electrical plug into the 120/240VAC outlet 48.

The third zone 22 includes an "Idle Control" on/off switch 52. This switch is typically used less frequently than switches 24, 26 or 46, and is therefore disposed at the lowermost area of the control panel 10. Switches 24 and 26, being much more commonly used, are disposed in the first zone 18. The auto throttle on/off switch 52 is used to choose whether or not the gas engine 16 will run at one constant speed, or throttle up and throttle down automatically depending on current draw on the generator 12.

From the foregoing, then, it will be appreciated that the control panel 10 of the present invention provides the switches, electrical outlets and circuit breakers typically used with a portable electric generator in a highly logically organized arrangement. The arrangement of the control panel 10 into distinct zones further significantly reduces the possibility of the user unintentionally attempting to engage the wrong electrical outlet with a given electrical plug. The placement of the various control switches also significantly improves the convenience of use of the control panel 10 by locating those switches which are accessed most frequently at the upper area of the control panel, while switches which are accessed less frequently are disposed at lower locations on the control panel. The generally central placement of the voltage selector switch 46 further helps to ensure that the operator will not accidentally select the wrong electrical outlet for use.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A control panel for a portable electric generator, comprising:

a first zone including at least an ON/OFF switch for the generator;

a second zone disposed adjacent said first zone, said second zone including:

a first electrical outlet disposed adjacent a first longitudinal end of said second zone;

and a second electrical outlet disposed adjacent a second longitudinal end of said second zone opposite to said first longitudinal end;

said first electrical outlet providing a first voltage output and said second electrical outlet providing a second voltage output which differs from said first voltage output; and a voltage selector switch disposed longitudinally in-between said first and second electrical outlets for allowing a user to select either said first outlet or said second outlet for use.

2. The control panel of claim 1, further comprising a third zone disposed adjacent said second zone and including a throttle control.

3. The control panel of claim 1, wherein each of said first and second zones comprise rectangular zones orientated horizontally and parallel to one another.

4. The control panel of claim 1, wherein said ON/OFF switch is disposed at a first longitudinal end of said first zone; and wherein said first zone further comprises a circuit breaker disposed at a second longitudinal end of said first zone opposite to said first longitudinal end.

5. The control panel of claim 4, wherein said ON/OFF switch and said circuit breaker are separated by an indicia panel disposed at a longitudinally central position of said first zone.

6. The control panel of claim 1, wherein:

said first electrical outlet is disposed within a first subzone of said second zone, and wherein said first subzone includes a plurality of first electrical outlets disposed in side-by-side relationship with one another;

said second electrical outlet is disposed within a second subzone of said second zone; and said voltage selector switch is disposed within a third subzone of said second zone generally horizontally inbetween said first subzone and said second subzone.

7. The control panel of claim 1, wherein said first and second zones are demarcated by a plurality of generally parallel extending frame members of a frame of said generator.

8. The control panel of claim 1, wherein said first zone is inclined relative to said second zone to thereby place said ON/OFF switch at an angle which is easier for a user to access.

9. A control panel for a portable electric generator having a frame, comprising:

a horizontally extending, rectangular first zone including at least one switch for controlling the generator;

a horizontally extending, rectangular second zone disposed vertically adjacent said first zone, said second zone including:

a first electrical outlet disposed adjacent a first longitudinal end of said second zone;

and a second electrical outlet disposed adjacent a second longitudinal end of said second zone opposite to said first longitudinal end;

said first electrical outlet providing a first voltage output and said second electrical outlet providing a second voltage output which differs from said first voltage output; and wherein said first and second zones are further demarcated by at least one longitudinally extending frame member of said frame of said generator.

10. The control panel of claim 9, wherein said switch comprises an ON/OFF switch.

11. The control panel of claim 9, further comprising a voltage selector switch disposed within said second zone longitudinally inbetween said first and second electrical outlets for allowing a user to select either said first electrical outlet or said second electrical outlet for use.

12. The control panel of claim 9, wherein said voltage selector switch comprises a horizontally disposed rocker style switch.

13. The control panel of claim 10, wherein said ON/OFF switch is disposed adjacent a first longitudinal end of said first zone; and further comprising a circuit breaker switch disposed adjacent a second longitudinal end of said first zone opposite to said first longitudinal end.

14. The control panel of claim 13, further comprising an indicia panel disposed inbetween said ON/OFF switch and said circuit breaker switch within said first zone.

15. The control panel of claim 9, further comprising a rectangular third zone disposed adjacent and parallel to said second zone, said third zone including a control for controlling an engine of said generator.

16. The control panel of claim 13, wherein said ON/OFF switch and said circuit breaker switch both comprise vertically oriented rocker style switches.

17. The control panel of claim 15, wherein said first, second and third zones are demarcated by a plurality of parallel disposed frame members of said frame of said generator.

18. The control panel of claim 9, wherein said second zone further comprises a plurality of thermal breakers each associated with a respective one of said electrical outlets and each disposed closely adjacent its respective said electrical outlet.

19. A control panel for a portable electric generator, comprising:

a horizontally extending, rectangular first zone including at least an ON/OFF switch for the generator and a circuit breaker disposed at opposite longitudinal ends of said first zone;

a horizontally extending, rectangular second zone disposed vertically adjacent said first zone, said second zone including:

a first electrical outlet disposed adjacent a first longitudinal end of said second zone; and a second electrical outlet disposed adjacent a second longitudinal end of said second zone opposite to said first longitudinal end;

said first electrical outlet providing a first voltage output and said second electrical outlet providing a second voltage output which differs from said first voltage output; and a switch disposed inbetween said first and second electrical outlets within said second zone for selecting for use one or the other of said first and second electrical outlets.

20. The control panel of claim 19, wherein said first and second zones are demarcated by a plurality of generally parallel extending frame members of a frame of said generator.

21. The control panel of claim 19, wherein said switch comprises a horizontally orientated rocker style switch.

22. The control panel of claim 19, further comprising a third zone disposed horizontally and adjacent to said second zone; said third zone including a control for controlling an engine of said generator.

23. The control panel of claim 19, further comprising a plurality of thermal breakers disposed adjacent respective ones of said electrical outlets and each being operably associated with respective ones of said respective electrical outlets.

24. The control panel of claim 19, wherein said first outlet is disposed within a first subzone of said second zone and said second electrical outlet is disposed within a second subzone of said second zone; and wherein said first subzone includes a plurality of electrical outlets disposed in a generally horizontally extending arrangement.

25. The control panel of claim 19, wherein said ON/OFF switch comprises a vertically orientated rocker style switch.

26. The control panel of claim 19, wherein said circuit breaker switch comprises a vertically orientated rocker style switch.

27. The control panel of claim 19, wherein said ON/OFF switch and said circuit breaker switch are separated by an indicia panel.

28. A control panel for a portable electric generator, comprising:

a horizontally extending, rectangular first zone including at least a first switch and a second switch disposed at opposite longitudinal ends of said first zone;

a horizontally extending, rectangular second zone disposed vertically adjacent said first zone, said second zone including:

a first electrical outlet disposed adjacent a first longitudinal end of said second zone;

and a second electrical outlet disposed adjacent a second longitudinal end of said second zone opposite to said first longitudinal end;

said first electrical outlet providing a first voltage output and said second electrical outlet providing a second voltage output which differs from said first voltage output;

a third switch disposed inbetween said first and second electrical outlets within said second zone for selecting for use one or the other of said first and second electrical outlets; and at least one frame member of a frame of said generator for demarcating at least one of said first and second zones.

29. The control panel of claim 28, further comprising a plurality of frame members for demarcating said first and second zones.

30. The control panel of claim 28, wherein said third switch comprises a horizontally orientated rocker style switch.

31. The control panel of claim 28, wherein said first switch comprises an ON/OFF switch.

32. The control panel of claim 28, wherein said second switch comprises a circuit breaker switch.

33. The control panel of claim 28, further comprising a third zone disposed adjacent said second zone and including a fourth switch for controlling said generator.

34. The control panel of claim 28, further comprising a plurality of thermal breakers each associated with a respective one of said electrical outlets.

* * * * *